United States Patent [19]

Spooner

[11] 4,349,815
[45] Sep. 14, 1982

[54] HEAD-MOVABLE FRAME-SCANNER FOR HEAD-COUPLED DISPLAY

[75] Inventor: Archer M. Spooner, Orlando, Fla.
[73] Assignee: Redifon Simulation Limited, Sussex, England
[21] Appl. No.: 111,284
[22] Filed: Jan. 11, 1980
[30] Foreign Application Priority Data
   Jan. 11, 1979 [GB] United Kingdom ............... 7901007
[51] Int. Cl.³ .............................................. G09G 3/02
[52] U.S. Cl. ..................................... 340/705; 340/755;
         340/795; 340/27 R; 340/815.31; 358/89;
         358/250; 434/44
[58] Field of Search ........... 340/27 R, 27 AT, 27 NA,
         340/380, 712, 706, 805, 814, 709, 705, 795, 755;
         350/6.8, 6.5; 434/44, 38, 43; 358/103, 104,
         88–90, 250; 356/152; 455/605, 606, 609, 612, 755

[56] References Cited

U.S. PATENT DOCUMENTS

| | | | |
|---|---|---|---|
| 3,614,314 | 10/1971 | Rossire | 358/88 |
| 3,970,359 | 7/1976 | Starkweather | 350/6.8 |
| 3,995,110 | 11/1976 | Starkweather | 350/6.8 |

FOREIGN PATENT DOCUMENTS 1527049 10/1978 United Kingdom .......... 340/27 NA

OTHER PUBLICATIONS

"Helmet Mounted Sights and Display Systems", Shepherd, May 1975.
IBM Technical Disclosure Bulletin, Fisher et al., "Vibrating Display Unit", vol. 22, No. 1, Jun. 1979, pp. 6–8.

*Primary Examiner*—James J. Groody
*Attorney, Agent, or Firm*—Larson and Taylor

[57] ABSTRACT

The invention provides line scanning and frame scanning apparatus for the projection of images, particularly for head-coupled area-of-interest visual display apparatus for ground-based flight simulators. The line scan apparatus is cockpit-mounted and comprises a modulated laser beam which is scanned over a line of fibre optic guides forming a ribbon by which the line image is transmitted to a helmet-mounted frame scanner. A sensor measures head/helmet movement to permit voluntary scanning of a wide angle of simulated view from the craft. The invention permits of lightweight helmet-mounted equipment for this purpose.

11 Claims, 4 Drawing Figures

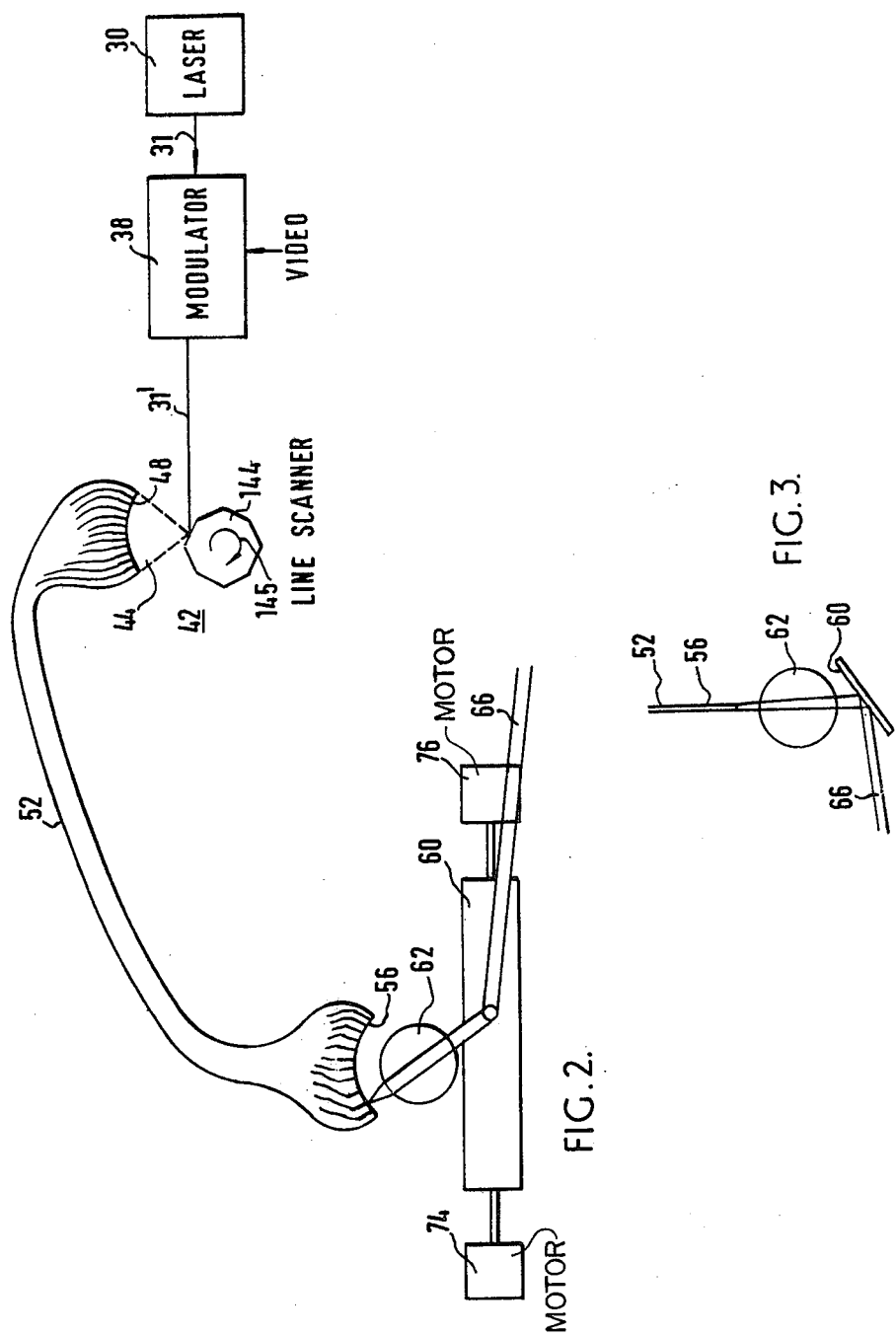

HEAD-MOVABLE FRAME-SCANNER FOR HEAD-COUPLED DISPLAY

DESCRIPTION

This invention relates to visual display apparatus, particularly for ground-based flight simulators and particularly for providing a display covering a wide-angle field of view. The invention may be used in apparatus capable of providing either pseudo-collimated or stereoscopic viewing for a pilot.

The apparatus is of the head-coupled area-of-interest type, wherein an image is projected upon a screen and is appropriately changed both according to the simulated craft position and angular orientation and according to viewer's instantaneous line of view and is simultaneously moved on the screen to occupy the viewer's field of view.

Apparatus of this type is described in the prior art. Such apparatus provided an area-of-interest display for a viewer which was pseudo-collimated, that is, the same image was projected for left and right eyes, so as to appear at infinity.

The present invention is used in an improved form of such apparatus in which line scanning apparatus is cockpit-mounted, line image transmission is by fibre optic light guide ribbon and solely the frame scanning apparatus is mounted upon a helmet worn by the viewer.

Accordingly, the invention provides for apparatus providing viewer with a wide-angle, television-type raster scanned image projected upon a concave screen by deflecting a light spot of modulated intensity to form a scanning line and deflecting successive scanned lines to form the changing raster scanned image, fixed line scanning means, frame scanning means movable with the viewer and intermediate flexible light guide means comprising a fibre optic light guide having groups of fibres thereof fanned at the input and output ends of the light guide into concave arcuate shape, the fibre groups corresponding in number to individual image spot elements of a single instanteaneous scan line and being arranged in the same relative sequence at both input and output ends, rotatable mirror means positioned to reflect an incident modulated light beam over the arcuate configuration of fibres at the input end of the light guide, thereby to scan one line of the raster scanned image, angularly movable mirror means positioned at the output end of the light guide for frame scanning successive lines of the raster scanned image and projection lens means positioned between the output end of the light guide and the frame scanning mirror for focussing the output ends of the fibres onto the said screen.

SHORT DESCRIPTION OF DRAWINGS

In order that the invention may readily be carried into practice, one embodiment will now be described in detail, by way of example, with reference to the accompanying drawings, in which:

FIG. 2 is a diagrammatic view of laser source, laser beam modulator, line scanning, fibre optic light guide ribbon and frame scanning apparatus which uses the present invention in the line scanning, light guide and frame scanning apparatus;

FIG. 3 is a side view of the frame scanner of FIG. 2; and

DESCRIPTION OF THE EXAMPLE

The apparatus of FIG. 1 will be described first in order to illustrate the form of apparatus in which the present invention may be employed.

Figure 1:
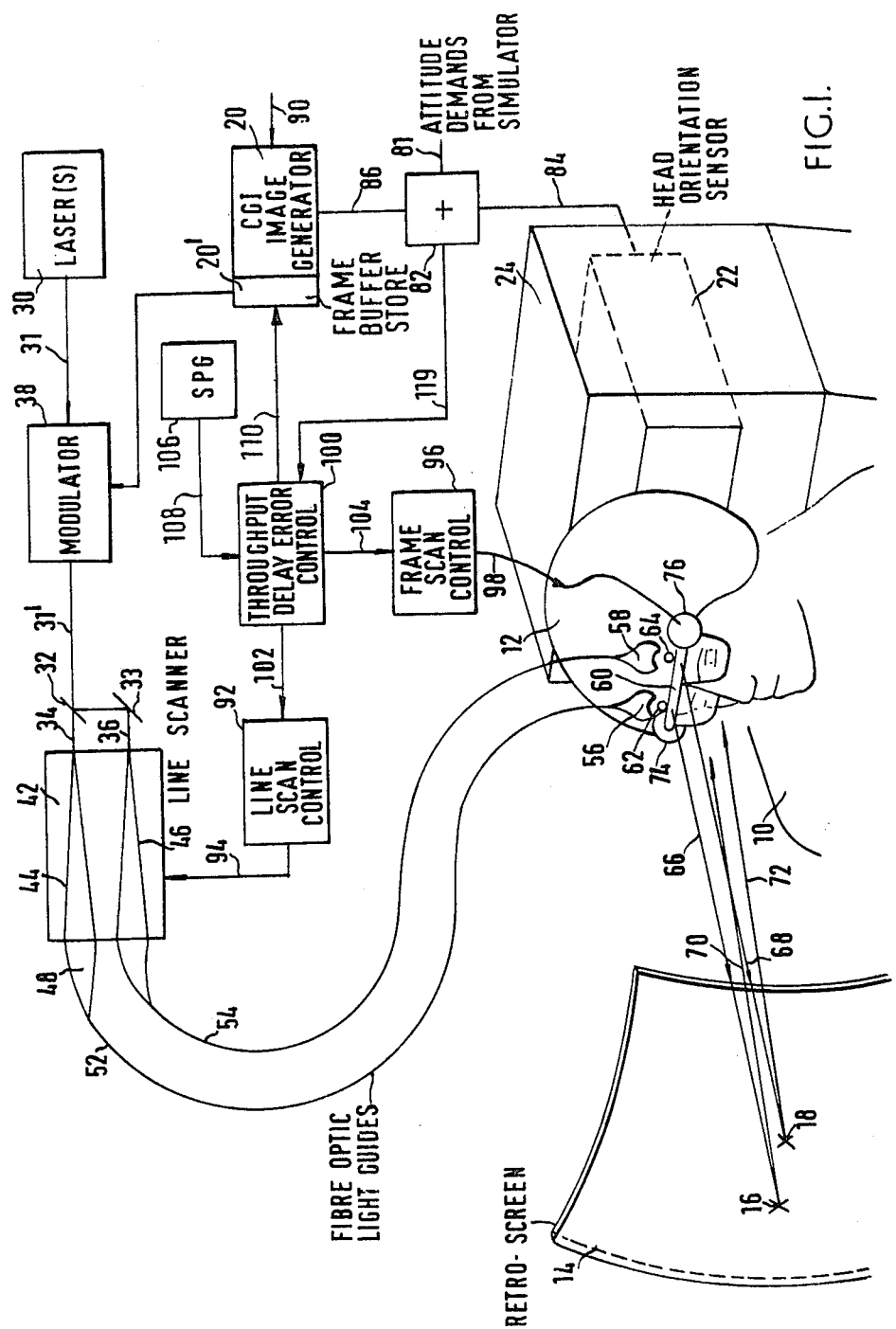
FIG. 1 is a diagrammatic perspective view showing a pilot seated in relation to a part-spherical screen for pseudo-collimated viewing of a head-coupled area-of-interest visual display.

FIG. 1 shows in diagrammatic form apparatus for generating and displaying a pseudo-collimated area-of-interest view. A pilot 10 wearing a helmet 12 is seated within a part-spherical shell having a retro-reflective interior surface partially represented in FIG. 1 by the concave retro-reflective screen 14. The pilot's line of vision, for right and left eyes and for distant viewing, intersects the screen at points 16 and 18, respectively. The field of view for each eye is centered on the respective one of these two points. The views displayed are identical for right eye and left eye but are displaced laterally by the distance between the points 16 and 18 so that the pilot 12 sees a pseudo-collimated view, that is to say, the displayed view appears to be at infinity and not at the distance of the screen 14. The combined left eye and right eye views will be referred to as the displayed scene.

The displayed scene depends, in this example, upon the simulated position of an aircraft during an exercise flight, the attitude of the aircraft, the pilot's seating position in the aircraft and the pilot's instantaneous line of view as determined by the instantaneous orientation of the pilot's head and helmet. The position of points 16 and 18 on the screen 14 and hence the position of the displayed views on the screen depends only on the pilot's head and helmet orientation.

The image required is generated by an image generator 20 of the computer-generated image type and which includes a frame buffer memory or store 20'. The pilot's head orientation is sensed by a head orientation sensor 22, which is fixedly mounted within the simulated aircraft cockpit in a mounting 24. The displayed view is projected onto the screen 14, centered in the appropriate locations as two raster-scanned images, the line scan apparatus being cockpit-mounted and the frame scan apparatus being mounted on the helmet 12. Line scan may be either across the screen 14 or up or down. In the present example, line scan is such that the projected scan line upon the screen and the line between the pilot's two eyes lie in the same plane. The frame scan is orthogonal thereto. Thus, when the pilot's head is erect, line scan is horizontal and frame scan vertical.

Referring still to FIG. 1, a laser source 30 provides an output laser beam 31 which is directed through a full colour modulator 38 to provide a modulated laser beam 31'. The modulated beam 31' is directed through beam-splitter and reflector elements 32, 33 to provide two beams 34 and 36 of equal intensity. The modulator 38 is controlled from the image generator 20 according to the view to be projected. Both modulated beams 34 and 36 pass to a double line scanner 42 fixedly mounted in the simulated aircraft cockpit. The two scanners, described in detail later herein, provide two respective scanned beams 44 and 46 which are respectively scanned over the input ends 48 and 50 of two fibre optic light guide ribbons 52 and 54.

The two fibre optic light guides provide a flexible linkage between the fixed line scanner 42 and the movable helmet 12. The emergent scanned light beams from the respective ends 56 and 58 of the light guides 52 and 54 are focussed by spherical lenses 62 and 64 onto the screen 14 and directed onto a plane mirror 60. The right eye beams are reflected by the mirror 60 along divergent paths to form a scan line, the center of which is shown at 66. Similarly, the left eye beams are reflected by the mirror 60 along divergent paths to form a scan line, the center of which is shown at 68. The center line of the respective right eye and left eye views is thereby formed on the screen 14, each line having its respective mid point at 16 and 18 and being viewed by the pilot 10 in the respective line of view 70 and 72.

The mirror 60 is long in relation to its width and is carried in bearings at its end which are mounted on the helmet 12. These bearings are provided by motors 74 and 76 at the two ends which move the mirror 60 to provide the required frame scan.

The mirror 60 may be a single plane mirror which is either oscillated or rotated by the motors 74, 76 on its axis parallel to the plane in which the line scan is projected or the mirror 60 may be a multi-faceted polygon mirror rod of, for example, octagonal cross-section which is continuously rotated by the motors 74, 76. In the present example, the mirror 60 is a single plane mirror and is rotationally oscillated for frame scan.

As the pilot's head moves, so does the displayed view move over the screen, so as to be in the pilot's new line of view and the view itself is changed according to the simulated real world view in the direction of the line of view.

To this end, the visual system receives data from the host flight computer on lines 80 and 81. Position data defining the simulated aircraft position throughout a simulated flight exercise is supplied to the image generator 20 on line 80. Attitude data, defining the simulated aircraft instantaneous attitude, is supplied on line 81 to a vector summing unit 82 together with head orientation data, defining the pilot's actual instantaneous line of view, on line 84. The summed output is supplied to the image generator 20 on line 86. A throughput delay error signal obtained by subtracting the head attitude input to the image generator one throughput delay period ago from the current head attitude position, is supplied to the throughput delay error control unit 100 on line 119.

The duplicated image, respectively for the right eye and left eye views, in accordance with the inputted data, and allowing for the known seating position of the pilot in the simulated aircraft type, are supplied to the resective modulators 38 and 40 on lines 88 and 90.

It will be appreciated that the change of the displayed image with simulated aircraft position is relatively slow. However, the change of the displayed image with head orientation is complete and relatively very rapid. The image generator is unable to compute an entirely new image immediately a new line of view is established due to the throughput delay of the image generator computer. To overcome this limitation the residual old displayed view is derotated to its former screen position until the computed new displayed view is available.

The required image derotation can be effected by controlling the relationship between the video signal and the line scan and frame scan positions. This control can be produced in a number of ways.

The line scanner is typically a continuously rotating polygon mirror which sweeps the input laser beam or beams through an arc to produce a line scan, as in the example of FIG. 2. Three alternatives are available:

(i) If the video signal is produced at a constant rate then the line scan drive may be phase modulated to maintain the correct line in space to produce an image with the correct spatial orientation. If the line projection system is capable of transmitting only the displayed field of view, then the image size will only be that part which is common to both the computed and projected images. If the fibre optic ribbon and the projection system is capable of projecting more than the required field of view in the line scan direction then the field of view obtained may be held constant.

(ii) The video signal may be produced at a constant rate and the line scanner rotated at a constant rate. The required angular shift may then be introduced with a supplementary mirror. Line scanning apparatus, alternative to that of FIG. 2 and including such a supplementary mirror is described later herein with reference to FIG. 4.

(iii) The polygon mirror may be run at a constant angular velocity and the video signal timing adjusted by altering the time at which the video signal is read out of the frame memory or store 20' of the image generator 20. This ensures that the video signal corresponding to a point in space is produced at the predetermined time that the scanner points the light beam at that part of the screen representing the required point in space.

Of these three methods described, method (i) involves the phase modulation of a mechanical system rotating at high speed and has the disadvantages associated with the inertia and response times of such a system. Method (ii) overcomes some of these problems by using a supplementary mirror. This mirror does not rotate at high speed but nevertheless has inertia inherent in any mechanical system and so it will have some response time. Method (iii) requires only the ability to read out a memory at controlled times. Since a memory is not a mechanical system, it has no inertia and can be read out in a discontinuous manner if required. Accordingly, method (iii) is the preferred method for line scan synchronisation in the present invention.

The frame scanner of FIG. 1 does not offer the same options as does the line scanner due to the difficulties of implementation. The alternative methods corresponding to those described for the line scanner are as follows:

(i) If the video signal is produced at a constant rate then the frame scan drive may be controlled to give the required pointing direction. In this case the frame scanner will be a position servomechanism driven by a sawtooth waveform in which the starting point of the ramp may vary in a controlled manner and the slope of the ramp may vary in a controlled manner in order to give a constant angular sweep in free space when the projector mount is being subjected to angular shifts.

(ii) The use of a supplementary mirror is impractical in the frame scanner of FIG. 1.

(iii) If the frame scanner is driven with a sawtooth of constant period, start point and slope, then the read out times from the frame memory or store 20' may be adjusted to produce the video signal when the scanner is at the required orientation in free space.

Of these three methods, method (i) requires adjustments to the period and rate of a mechanical system which, due to its construction, has a very low inertia. Hence, the settling time following such a disturbance may be acceptable. It can preserve the instantaneous field of view constant through the throughput delay period. Method (ii) is impractical due to the physical constraints of the projection lens and frame scanner assembly of FIG. 1. Method (iii) involves adjustment to a system without inertia or the requirements of continuity. However method (iii) reduces the virtual field of view during the throughput delay period.

Continuing with the description of the apparatus of FIG. 1, a synchronising pulse generator 106 supplies pulses on line 108 to the throughput delay error control unit 100.

Line scan control signals are supplied to the line scanners of unit 42 from unit 92 by way of line 94. Frame scan control signals are supplied to the frame scan motors 74, 76 from unit 96 by way of a flexible line 98. Video synchronisation timing pulses are fed to the frame buffer or memory 20' of the C.G.I. image generator 20, from the unit 100 on line 110. Control of the relative timings between the line scan control 92, the frame scan control 96 and the C.G.I. image generator frame buffer 20' is effected by the throughput delay error compensation circuit 100 by way of lines 102, 104 and 110, respectively.

It will be noted that the projection middle lines 66 and 68 do not coincide with the lines of view 70 and 72 for the reason that projection is effected from above the pilot's eyes. Projected onto any horizontal plane, the respective lines are coincident but, projected onto any vertical plane, the respective lines diverge away from the screen. The angle of divergence is small but is nevertheless great enough, compared with the apex angle of the half-brilliance cone of reflection of a retro-reflective screen material, to result in a viewed scene of much reduced brilliance. It is preferred therefore to use a screen of modified retroreflective material for which the axis of the half-brilliance cone of reflection is depressed downwardly by the angle between the projection lines 66, 68 and the line of view lines 70, 72.

Laser Source, Laser Beam Modulator, Line Scanner, Fibre Optic Light Guide Ribbon and Frame Scanner One laser source and laser beam modulator and the line scanner, fibre optic light guide ribbon and frame scanner apparatus of the present invention will be described together with reference to FIG. 2 and FIG. 3.

FIG. 3 shows the laser beam source 30 which provides the output laser beam 31 directed through the full colour modulator 38. Both the laser beam source 30 and the modulator 38 are of known form. The full-colour modulated beam output is shown at 31' in this figure, in which intermediate beam-splitters are not shown. The line scanner is shown generally at 42.

The line scanner comprises a synchronously-driven polygonal section mirror drum 144 which rotates continuously in the direction shown by the arrow 145 to sweep the beam 31' over the scan path 44. One pass occurs for the movement of each mirror facet of the mirror drum 144 past the beam 31'.

A fibre optic light guide, formed into a flat ribbon 52 over most of its length, has individual groups of fibres formed into an arc at the input end 48 of the light guide. The width of the line scan 44 exactly covers the arc at 48, so that the modulated beam 31' is scanned along the arc at 48 for each line of the image.

At the output end 56 of the fibre optic light guide 52, the individual groups of fibres are similarly formed into an arc the fibre groups occurring in the same sequence at the two ends 48 and 56, so that the scanned image line at the input end 48 is exactly reproduced at the output end 56.

The emergent rays from the output end 56 of the light guide 52 are focussed by the spherical lens 62 onto the face of the frame scanning mirror 60. As shown in FIG. 1, the mirror 60 is mounted on the pilot's helmet 12 in bearings provided by reciprocating motors 74 and 76.

With the mirror 60 stationary, the emergent rays are reflected from the mirror 60, as shown instantaneously at 66, to form a single line of the image. As the mirror 60 is moved, successive lines of the image are projected to form the entire scanned image.

FIG. 3 shows, in side view, the output end 56 of the light guide 52, the spherical lens 62, the mirror 60 and the reflected beam 66 as described above with reference to FIG. 2.

A second line scanner, comprising a second mirror drum, produces a second line scan over the input end 50 of the second fibre optic light guide 54, as is shown in FIG. 1. The output end 58 of this second light guide 54 provides emergent rays which are focussed by a second spherical lens 64 onto the same reciprocating mirror 60. The two helmet mounted optical systems, with the common frame scan mirror 60, together provide the right eye image and left eye image of the pilot's displayed view. As already explained, the identical right eye and left eye images provide the pseudo collimated display for the pilot. The line scanner, fibre optic light guide ribbon and output lens are duplicated, with a common frame scanner, in order to provide, in the duplication of the fibre optic light guides, for possible fracture of one or more fibres associated with any specific spot in the raster lines.

For stereoscopic viewing, different left-eye and right-eye images comprising a stereoscopic pair of images would be transmitted by the two light guides.

Figure 4:
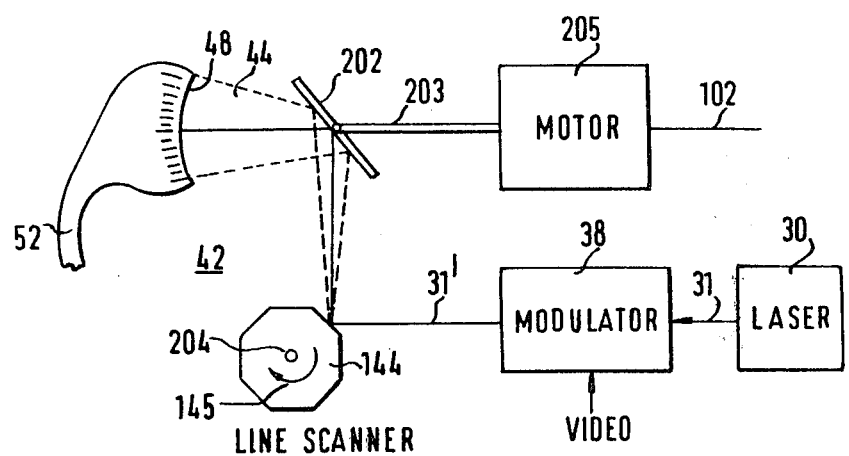
FIG. 4 is a detail view showing an alternative line scanner to that of FIG. 2.

FIG. 4 shows line scanning apparatus alternative to that of FIG. 2 and including a supplementary mirror 202. The mirror 202 is pivotable on an axis 203 which is parallel to the spin axis 204 of the polygon mirror line scanner 144.

To effect image derotation for head movement in the direction of line scan by the method (ii) described earlier, the mirror 202 is rotationally positioned about its axis 203 by a motor 205 in a controlled manner so that the swept arc 44 is positioned at the required part of the arc 48 at the input end of the fibre optic light guide 52. The motor 205 is controlled from the throughput delay error control unit 100 by a single on line 102.

I claim:

1. For apparatus providing a viewer with a wide-angle, television-type raster scanned image projected upon a concave screen by deflecting a light spot of modulated intensity to form a scanned line and deflecting successive scanned lines to form the changing raster scanned image, fixed line scanning means, frame scanning means movable with the viewer and intermediate flexible light guide means comprising a fibre optic light guide having groups of fibres thereof fanned at the input and output ends of the light guide into concave arcuate shape, the fibre groups corresponding in number to individual image spot elements of a single instantaneous scan line and being arranged in the same relative sequence at both input and output ends, said line scanning means comprising rotatable mirror means positioned to reflect an incident modulated light beam over the arcuate configuration of fibres at the input end of the light guide means, thereby to scan one line of the raster scanned image, said frame scanning means comprising angularly movable mirror means positioned at the output end of the light guide for frame scanning successive lines of the raster scanned image and said apparatus further comprising projection lens means positioned between the output end of the light guide means and the frame scanning mirror means for focussing the output ends of the fibres onto the said screen.

2. Apparatus as claimed in claim 1, in combination with a ground-based flight simulator which includes a pilot dummy cockpit and a pilot-movable helmet, in which the line scanning means is fixedly-mounted in the cockpit, the frame scanning means is mounted on the pilot-movable helmet and the intermediate flexible light guide means provides a flexible light-transmitting means between the fixed line scanning means and the movable frame scanning means.

3. Apparatus as claimed in claim 1 or claim 2, in which the rotatable mirror means is a rotating polygon mirror arranged to scan the modulated light beam directly over the arcuate shaped input fibres of the fibre optic light guide.

4. Apparatus as claimed in claim 2, in which the rotatable mirror means is a rotating polygon mirror arranged to scan the modulated light beam over the arcuate shaped input fibres of the fibre optic light guide by way of an intermediate mirror which is movable to select that portion of the arcuate configuration of fibres which is scanned by the polygon mirror.

5. Apparatus as claimed in claim 2 in which the rotatable mirror means is a plane mirror pivotably mounted on the pilot-movable helmet, driven by motor means for frame scanning movement and lens means are provided between the output end of the fibre optic light guide and the plane mirror for focussing output light from the fibre optic light guide onto the said screen by way of the plane mirror.

6. Apparatus as claimed in claim 5, in which the plane mirror simultaneously performs frame scanning of a right-eye image and a left-eye image for the pilot.

7. Apparatus as claimed in claim 6, wherein the output ends of a pair of said fibre optic light guides together with associated lens means respectively are provided for said right-eye and left-eye images, mounted at spaced-apart positions on the pilot-movable helmet above pilot right-eye and left-eye locations relatively to said helmet.

8. Apparatus as claimed in claim 4, in which the rotatable mirror means is a plane mirror pivotably mounted on the pilot-movable helmet, driven by motor means for frame scanning movement and lens means are provided between the output end of the fibre optic light guide and the plane mirror for focussing output light from the light guide onto the said screen by way of the plane mirror.

9. Apparatus as claimed in claim 8, in which the plane mirror simultaneously performs frame scanning of a right-eye image and a left-eye image for the pilot.

10. Apparatus as claimed in claim 9, having the output ends of a pair of fibre optic light guides together with associated lens means respectively for said right-eye and left-eye images, mounted at spaced-apart positions on the pilot-movable helmet above pilot right-eye and left-eye locations relatively to said helmet.

11. Apparatus as claimed in claim 1, in which the rotatable mirror means is a rotating polygon mirror arranged to scan a modulated light beam over the concave arcuate shaped input fibres of the fibre optic light guide by way of an intermediate mirror which is movable to select that portion of the arc formed by the light guide input fibres which is scanned by the polygon mirror.

* * * * *